US005844219A

United States Patent [19]

Wallner

[11] Patent Number: 5,844,219

[45] Date of Patent: Dec. 1, 1998

[54] POS TERMINAL WITH REPLACEABLE PRINTER CARTRIDGE

[75] Inventor: George Wallner, Phoenix, Ariz.

[73] Assignee: Hypercom, Inc., Phoenix, Ariz.

[21] Appl. No.: 946,476

[22] Filed: Oct. 7, 1997

Related U.S. Application Data

[63] Continuation of Ser. No. 494,263, Jun. 23, 1995, abandoned.

[51] Int. Cl.$^{6}$ .......... G06K 5/00

[52] U.S. Cl. .......... 235/380; 235/379; 235/449; 902/22; 902/26; 902/27

[58] Field of Search .......... 235/380, 379, 235/375, 381, 449, 462, 472, 493; 902/22, 26, 27; 400/83, 88, 207, 486, 593, 621

[56] References Cited

U.S. PATENT DOCUMENTS

| | | | |
|---|---|---|---|
| 3,818,187 | 6/1974 | Lovendusky et al. | 235/380 |
| 3,972,283 | 8/1976 | Jennings | 101/226 |
| 4,752,876 | 6/1988 | Couch et al. | 235/381 X |
| 4,912,309 | 3/1990 | Danielson et al. | 235/380 |
| 5,006,002 | 4/1991 | Brodbeck | 400/613.2 |
| 5,265,951 | 11/1993 | Kumar | 312/223.2 |
| 5,294,782 | 3/1994 | Kumar | 235/462 |
| 5,371,348 | 12/1994 | Kumar et al. | 235/472 |

*Primary Examiner*—Donald T. Hajec
*Assistant Examiner*—Michael G. Lee
*Attorney, Agent, or Firm*—Snell & Wilmer L.L.P.

[57] ABSTRACT

A point of service (POS) terminal having an integral field replaceable printer for printing a customer receipt and a method for replacing the integral printer are provided. The POS terminal comprises a single, unitary housing which houses the various components typically associated with a POS terminal, but which is also configured to accommodate an integral printer within the terminal housing. The integral print module may be easily accessed, removed and replaced by a merchant without the use of tools or special training and instruction. A moveable access panel associated with the terminal housing provides access to the removable, replaceable printer cartridge and allows the printer cartridge to be removed from the POS terminal and replaced without having to disassemble the POS terminal.

17 Claims, 3 Drawing Sheets

POS TERMINAL WITH REPLACEABLE PRINTER CARTRIDGE

RELATED APPLICATIONS

This patent application is an FWC of, and claims the benefit of, Ser. No. 08/494,263 filed Jun. 23, 1995 entitled "POS TERMINAL WITH REPLACEABLE PRINTER CARTRIDGE" by George Wallner, now abandoned.

TECHNICAL FIELD

The present invention relates, generally, to a point of service (POS) terminal having an integral printer for printing a customer receipt and, more particularly, to a POS terminal configuration which permits the operator to manually remove and replace a printer cartridge quickly and efficiently.

BACKGROUND ART AND TECHNICAL PROBLEMS

Point of Service (POS) terminals are used extensively throughout the United States by merchants of services and merchandise to facilitate the authorization and consummation of sales transactions with consumers using charge cards, credit cards, debit cards and the like. As the feature set of POS terminals and associated peripheral devices expands, the use of POS terminals is expected to largely supplant or even replace the use of cash and checks in many contexts.

Presently known POS terminals generally include at least a minimum set of features and capabilities. For example, a typical POS terminal is suitably capable of constructing an authorization message, and dialing up a predetermined destination over a conventional telephone line to communicate with a central computer to thereby authorize a particular sales transaction. Once the transaction is consummated, the POS terminal transmits another message to the host computer whereupon the information relating to the transaction is stored in the host computer. At the end of a business cycle, typically at the end of a business day, the POS terminal again dials up the host computer and reconciles the day's transactions so that the records maintained by the merchant correspond with the records maintained at the host computer.

In many contexts, it is preferable to configure the POS terminal to print a transaction record, for example a receipt, which is typically printed on at least two copies: a first copy for the consumer, which functions as the consumer's receipt, and a second copy maintained by the merchant for his accounting records.

Presently known POS terminals are often equipped with one or more peripheral devices, for example a printer module for printing the aforementioned receipt, a keypad module for permitting a consumer to discretely enter his secret personal identification number (PIN) out of the merchant's view, and the like. In view of the highly cost competitive environment in which POS terminals are currently distributed, enhanced feature sets and low cost are important purchase considerations.

Presently known POS terminals which employ a separate, typically dedicated printer module are disadvantageous in several respects. In the first instance, a printer module requires a separate housing, processor, power connection, and the like, thereby increasing the cost of the POS/printer combination. Moreover, even though a separate, remote printer module may be quickly detached from the POS terminal and replaced if the printer module breaks down, this requires the merchant to either keep a separate printer module on hand, or to manually write out receipts until another module can be obtained. Due to the relatively high cost of stand alone printer modules, keeping additional print modules on hand can be prohibitively expensive, particularly for small businesses.

A POS terminal and printer system is thus needed which overcomes the shortcomings of the prior art.

SUMMARY OF THE INVENTION

The present invention provides methods and apparatus for integrating a printer module with a POS terminal in a manner which overcomes many of the shortcomings of the prior art.

In accordance with a preferred embodiment, a POS terminal is provided with a single, unitary housing which houses the various components typically associated with a POS terminal, but which is also configured to accommodate an integral printer within the terminal housing. In accordance with a further aspect of the present invention, the print module may be easily accessed, removed, and replaced by the merchant without the use of tools, special training and instruction, or the like. Moreover, the removable, replaceable printer cartridge of the present invention may be removed from a POS terminal and replaced without having to disassemble the POS terminal.

In accordance with a further aspect of the present invention, the subject replaceable printer cartridge is considerably less expensive than prior art stand alone print modules. Consequently, a merchant may keep a plurality of print cartridges on hand without consuming excessive operating revenue for inventory purposes.

BRIEF DESCRIPTION OF THE DRAWING FIGURES

The subject invention will hereinafter be described in conjunction with the appended drawing figures, wherein like numerals denote like elements, and;

DETAILED DESCRIPTION OF PREFERRED EXEMPLARY EMBODIMENTS

Figure 1:
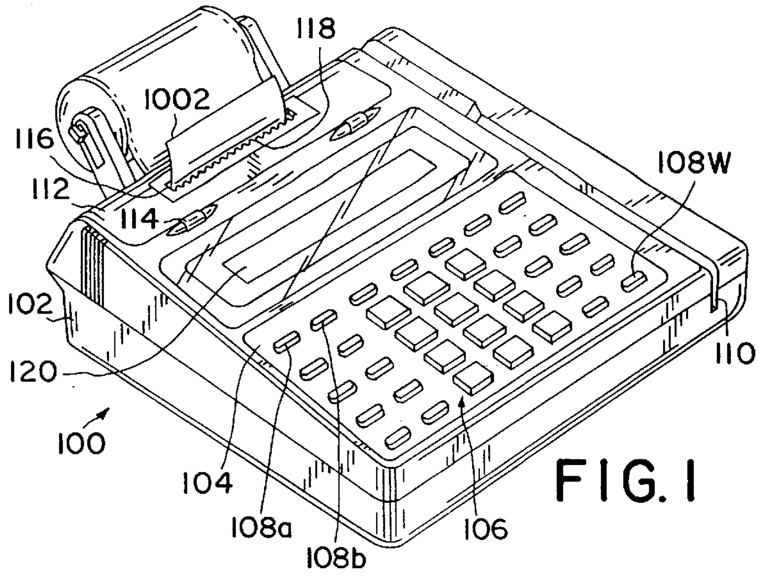
FIG. 1 is a perspective view of an exemplary POS terminal in accordance with the present invention.

Referring now to FIG. 1, a preferred embodiment of an exemplary POS terminal 100 suitably comprises and integral, unitary housing 102 which houses the various electronic and other components associated with the terminal. POS terminal 100 further comprises a keyboard 104 which permits the user to interface with the terminal to effect a variety of functions, as desired. For example, keyboard 104 suitably comprises an alphanumeric keypad 106, for example corresponding to the numbers zero through nine and including the keys "*" and "#". In addition, various other function keys 108*a*, 108*b*, . . . 108*w* may be used in the context of a number of functions, including cancel, batch review, reprint, paper feed, void, and the like. In addition, terminal 100 further comprises a display screen 120, for example a conventional two-line display.

With continued reference to FIG. 1, POS terminal 100 suitably comprises a slot 110 through which a transaction card (e.g., credit card, debit card) is drawn; a magnetic stripe reader and associated magnetic stripe reader circuit are disposed within housing 102 (not shown) to "read" the magnetic stripe on the card as the card is slid through slot 110. The information embodied in the magnetic stripe is captured by the circuitry resident within housing 102 and utilized in the authorization of sales, the consummation of sales, and the like. Terminal 100 may also include virtually any other mechanism for data input/output including, inter alia, a bar code wand, smart card interface, or the like. In this regard, reference is made to applicant's co-pending patent application Ser. No. 08/379,734 entitled "Virtual POS Terminal" filed Jan. 27, 1995, by the present inventor, the entire disclosure of which is hereby incorporated by this reference.

In the preferred embodiment illustrated in FIG. 1, terminal 100 suitably comprises an access door 112, which is suitably mounted to housing 102 at respective hinges 114. Access door 112 suitably comprises a paper slot 116 through which paper 1002 extends. In accordance with one aspect of the present invention, after a sales transaction is consummated, terminal 100 causes its internal printer circuit, described in greater detail below, to print information pertaining to the sales transaction on paper 1002; that portion of paper 1002 which comprises a receipt for a particular transaction may then be torn off by the merchant, whereupon the merchant typically retains one copy of the receipt and gives the other copy to the consumer. For this purpose, slot 116 suitably exhibits a serrated slot 118 to facilitate the tearing or cutting of paper 1002.

Figure 2:
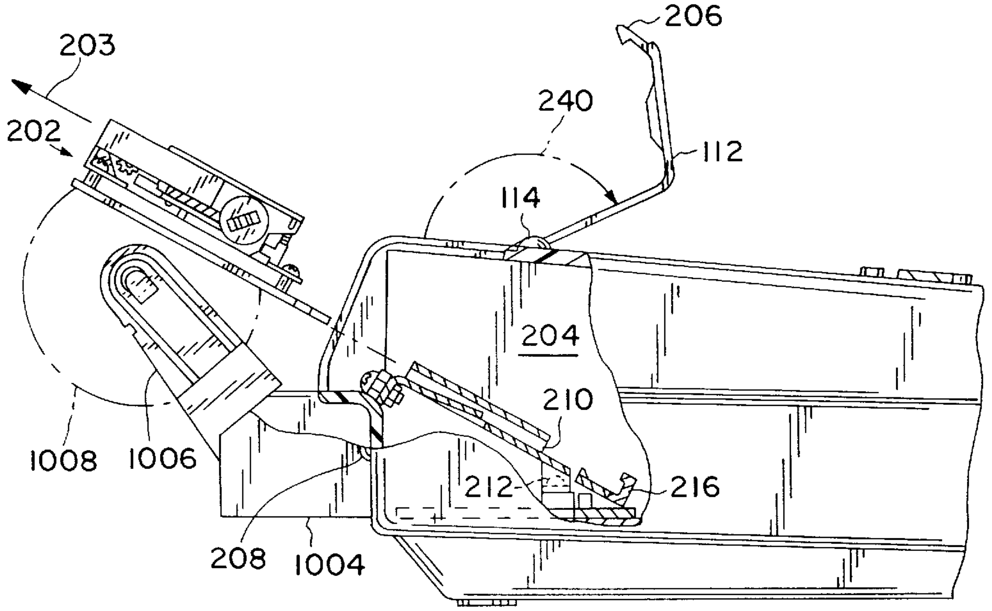
FIG. 2 is a partially cut-away left-side elevation view of the terminal in FIG. 1 with the replaceable printer cartridge shown removed from the housing.

Referring now to FIGS. 1 and 2, access door 112 may be conveniently opened by the merchant, thereby permitting access to the interior 204 of housing 102. In a preferred embodiment, access door 112 comprises one or more resiliently flexible locking tabs 206 which are configured to lock the door in the closed position, for example by engaging one or more lips 208 which are suitably integral with housing 102. More particularly, when access door 112 is in its closed position, tab 206 engages lip 208 to thereby secure and lock door 112 in place, substantially prohibiting dust and other debris from entering the housing and perhaps interfering with the operation of the printer circuit. When a merchant desires to access the interior 204 of housing 102, for example to change or replace a printer assembly, the merchant simply grasps tab 206 and manually releases the tab from lip 208, and opens door 112. To close door 112, tab 206 may be lightly pressed with manual pressure to re-engage tab 206 to lip 208.

Figure 5:
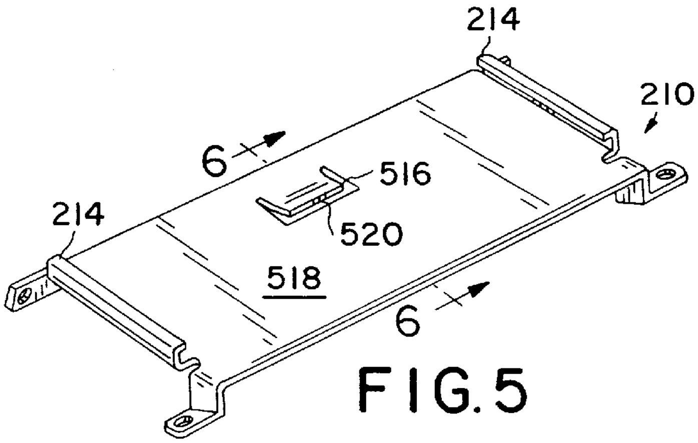
FIG. 5 is a perspective view of printer support shown in FIG. 2.
Figure 6:
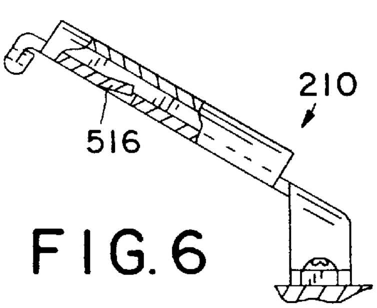
FIG. 6 is a side view of the printer support assembly taken along line 6—6 in FIG. 5.

With continued reference to FIG. 2, a printer assembly support bracket 210 is suitably secured within the interior of housing 102, for example by respective screws 212. As best seen in FIG. 5, support bracket 210 suitably comprises one or more guide rails 214 into which printer assembly 202 is inserted, as discussed in greater detail below.

With continued reference to FIG. 2, terminal 100 further comprises an electrical interface board 216 for maintaining electrical communication between printer assembly 202 and various other electrical components which comprise POS terminal 100.

Figure 3:
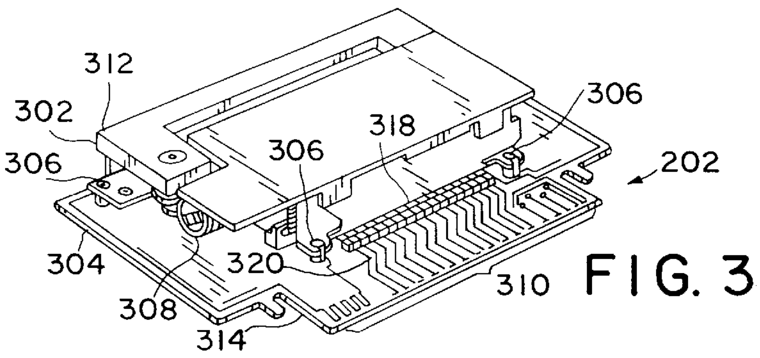
FIG. 3 is a perspective view of the printer assembly shown in FIG. 2.

Referring now to FIG. 3, printer assembly 202 suitably comprises a print cartridge 302 mounted to a print substrate 304, for example by a plurality of fasteners (e.g. screws) 306. Printer cartridge 302 may be any suitable print cartridge capable of interacting with terminal 100 and printing suitable receipts onto paper 1002. In the preferred embodiment described herein, printer cartridge 302 suitably comprises an Epson Micro Dot Printer M-192 available from the Seiko Epson Corporation of Japan. In particular, operational details of printer cartridge 302 are set forth in the M-192 specification, Revision A, created Jan. 6, 1992 and also available from the Seiko Epson Corporation, the entire disclosure of which is hereby incorporated herein by this reference.

With continued reference to FIG. 3, printer cartridge 302 suitably implements the function of printing a receipt onto paper 1002 as it rolls off of paper roll 1008. More particularly, electrical power for powering printer cartridge 302 is suitably derived from the same electrical power source used to power terminal 100. Power suitably flows from an external power source (not shown) to electrical interface 216 (see FIG. 2), and thereafter to substrate 304 and ultimately to cartridge 302. The electrical power applied to cartridge 302 drives a printing head which imprints transaction data onto receipt 1002, for example information pertaining to the name and/or location of the merchant, the date, the time, the amount of purchase, and virtually any other information desired by the merchant.

In addition, cartridge 302 suitably includes a ribbon module 312 which, in the illustrated embodiment, is manually detachable from cartridge 302. Ribbon cartridge 312 is suitably configured to scroll a ribbon embedded with ink between the printing head (not shown) and paper 1002 as the printing head prints onto the receipt. For this reason, among others, it is important to maintain proper alignment between the printing head of printer assembly 202, on the one hand, and receipt 1002 on the other hand in order to ensure proper alignment of the printed matter on the receipt. In addition, it is desirable to supply an appropriate amount of power to the printing head to ensure that the printing head contacts the ribbon and receipt 1002 with sufficient force to yield printing of sufficient density. In this regard, POS terminals often use receipts which are two and perhaps three copies deep; hence, paper 1002 may comprise two or more sheets, for example a white merchant copy and a yellow customer copy disposed immediately behind the white copy. If insufficient power is applied to the printing head, it is possible that the top and even the bottom copy of the receipt may be unsatisfactorily faint.

With continued reference to FIG. 3, printer cartridge 302 also suitably comprises a rolling mechanism, generally identified by driver assembly 308, which urges receipt 1002 through the printer cartridge, while at the same time ensuring that the movement of the ribbon across the receipt is coordinated with the movement of the receipt through the cartridge and the action of the printer head upon the ribbon.

Printer cartridge 302 further comprises a pin bar 318 which essentially defines the point at which the various electrical leads associated with cartridge 302 interface with terminal 100.

More particularly, pin bar 318 suitably comprises a plurality of electrical leads which extend from cartridge 302 to substrate 304 as shown in FIG. 3 at junction 320. These electrical contacts terminate at a pin termination site 310.

Figure 4:
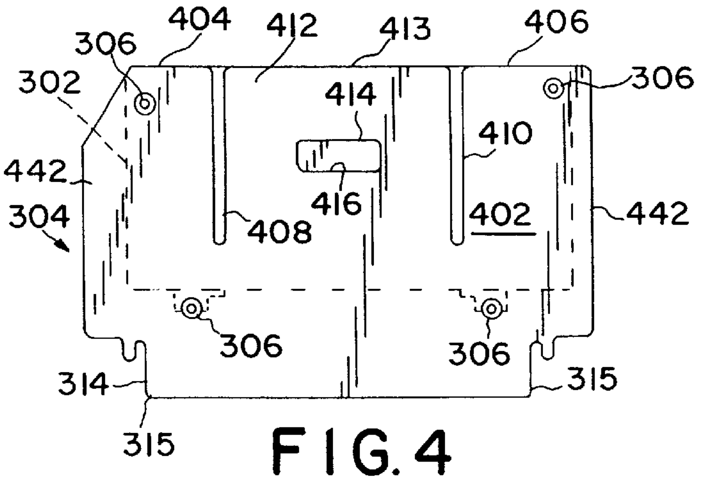
FIG. 4 is a bottom view of the printer assembly shown in FIG. 3.
Figure 8:
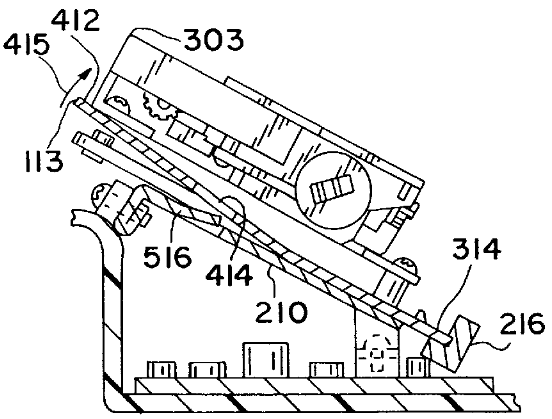
FIG. 8 is a side view of the printer assembly of FIG. 7 shown with the release mechanism actuated.

Referring now to FIGS. 3 and 4, substrate 304 suitably comprises a substantially rigid, thin planar platform 402, having a pin surface 314 extending from one edge thereof. Substrate 304 further comprises respective fingers 404 and 406, and respective slots 408 and 410 defining a tongue 412 having an aperture 414 extending therethrough. Slots 408 and 410 permit tongue 412 to be resiliently deformed from the plane defined by platform 402, as discussed in greater detail below in connection with FIG. 8. Aperture 414 suitably comprises a leading edge 416, also discussed in detail below.

Cartridge 302 is suitably secured to substrate 304 by respective fasteners 306. As best seen in FIGS. 3 and 4, these fasteners are located on respective fingers 404 and 406, and near extension 314; in accordance with a preferred embodiment, cartridge 302 is suitably not rigidly secured to substrate 304 in the vicinity of at least the distal end of tongue 412, thus permitting the resilient deformation of tongue 412 with respect to the rest of printer assembly 202.

Respective pin terminations 310 suitably extend along and terminate near the distal edge of extension 314; alternatively, respective terminations 310 may suitably wrap around the distal edge of extension 314 to ensure sufficient electrical contact with interface board 216, as discussed below.

Referring now to FIGS. 2 and 5–8, printer assembly 202 or, alternatively, printer cartridge 302, may be conveniently removed from and inserted into housing 102 without the use of tools, adhesives, fasteners, or the like. More particularly, respective edges 442 (see FIG. 4) of substrate 304 are suitably configured to slide within and be secured by respective rails 214 of bracket 210. As best seen in FIG. 5, bracket 210 suitably comprises a finger 516 which extends upwardly from the plane defined by surface 518. Finger 516 suitably terminates at a leading edge 520.

Figure 7:
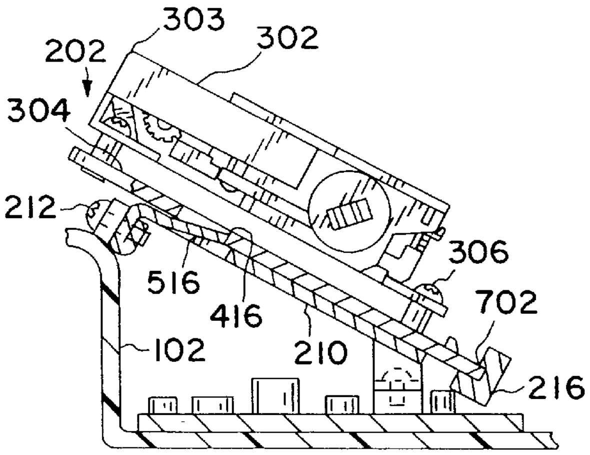
FIG. 7 is a partially cut-away view of the printer assembly shown seated in the printer support which is secured inside the POS terminal housing in accordance with a preferred embodiment of the present invention.

With particular reference to FIG. 7, printer assembly 202 is suitably secured within terminal 100 by, inter alia, the gripping action of rails 214 upon respective edges 442 of substrate 304. In addition, extension 314 of substrate 304 is suitably received within a female receptacle 702 of interface board 216; receptacle 702 is suitably shown as a substantially U-shaped channel in FIG. 7. Receptacle 702 suitably includes a plurality of electrical leads corresponding to respective terminations 310 of printer assembly 202, thereby establishing and maintaining a mechanically secure electrical connection between printer cartridge 302 and terminal 100.

With continued reference to FIGS. 2 and 5–8, it can be seen that movement of printer assembly 202 from left to right with respect to housing 102 is substantially impeded by interface board 216 (which is suitably secured to housing 102 in any convenient manner, not shown here for clarity). In addition, movement of printer assembly 202 from right to left in FIG. 7 is substantially impeded by the interference between leading edge 520 of finger 516 and leading edge 416 of aperture 414 (see FIG. 4). Lateral movement of printer assembly 202 is substantially constrained by respective rails 214 of bracket 210. Thus, printer assembly 202 remains substantially mechanically and electrically secured within terminal 100 during normal operation and transport of terminal 100.

When it is desired to remove printer assembly 202 from terminal 100, the merchant simply opens door 112 (see arrow 240 in FIG. 2), thereby exposing the rear end (to the left of FIG. 7) of printer assembly 202. To release printer assembly 202 from terminal 100, the merchant simply pulls upwardly on a flexible tongue 412 in the direction of arrow 415 in FIG. 8. This may be conveniently done by grasping the top edge 303 of print cartridge 302 and edge 413 of substrate 304 between the thumb and forefinger and pulling rearwardly on assembly 202, for example along arrow 203 of FIG. 2. By moving tongue 412 along arrow 415, aperture 414 (and in particular leading edge 416 thereof) may be conveniently raised above leading edge 520 of finger 516 allowing printer assembly 202 to be slidingly withdrawn from the housing. Once removed, printer assembly 202 may be inspected, repaired, or discarded, as desired. A new printer assembly 202 may be installed into housing 102 in the following manner.

With door 112 in the open position, printer assembly 202 is aligned with respective rails 214 of platform 210. More particularly, respective corners 315 of structure 304 are suitably aligned with the rearward edges of respective rails 214, to thereby engage respective edges 442 of substrate 304 into respective rails 214. Once assembly 202 is aligned with support 210, the merchant may conveniently manually urge assembly 202 downwardly and into housing 102, substantially along the plane defined by surface 518. When finger 516 encounters leading edge 416 of aperture 414, tongue 412 will snap downwardly such that finger 520 extends into and preferably through aperture 414. Extension 314 is thus urged into and received by U-shaped receptacle 702, thereby establishing a secure electrical and mechanical contact between printer assembly 202 and each of support platform 210 and electrical interface 216. Paper 1002 from roll 1008 may then be fed into a suitable slot in housing 102 (not shown for clarity), through print assembly 202, and out slot 116.

Referring now to FIGS. 2 and 9–12, the manner in which paper roll 1008 cooperates with terminal 100 will now be described.

Paper roll 1008 is suitably retained between respective arms 1006. Respective arms 1006, in turn, are suitably secured to housing 102 at respective supports 1004 which extend from and are preferably integral with housing 102.

Figure 9:
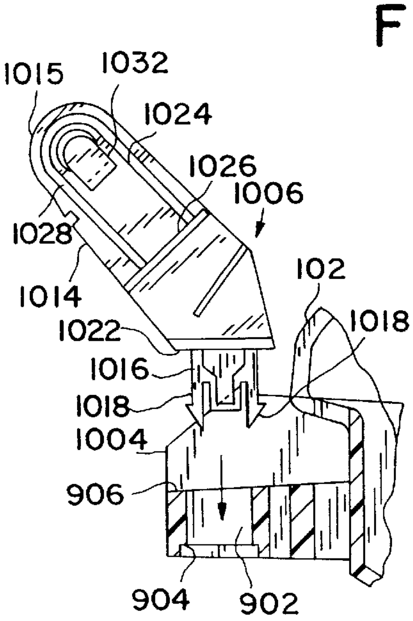
FIG. 9 is a partially exploded view of a printer roll arm shown apart from the rear of the terminal housing of FIG. 2.
Figure 10:
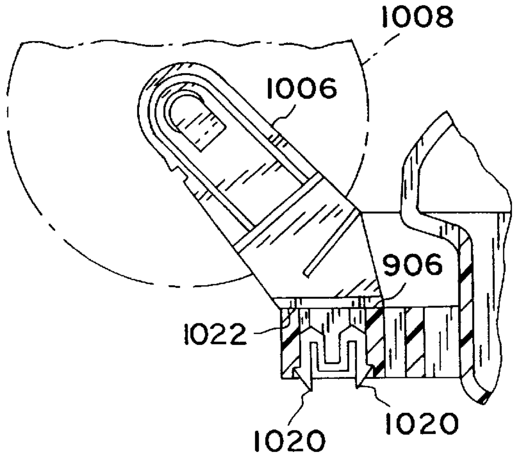
FIG. 10 is a close-up, partially cut-away view of the print roll arm of FIG. 9 shown locked into position.

With particular reference to FIGS. 9 and 10, arm 1006 suitably comprises a retainer portion 1014 and a shank 1016. Shank 1016 further comprises respective resiliently deformable legs 1018. Retainer 1014 suitably comprises a generally U-shaped arch 1015, a pivoting member 1024, and an arch-shaped slot 1028 disposed therebetween. Pivoting member 1024 suitably joins arm 1006 at a junction 1026. In a preferred embodiment, retainer 1014 is made of semi-rigid plastic, such that the U-shaped void 1028 permits pivoting member 1024 to pivot slightly out of the page about junction 1026 as viewed in FIG. 9 (from left to right as shown in FIG. 12, discussed below).

Figure 12:
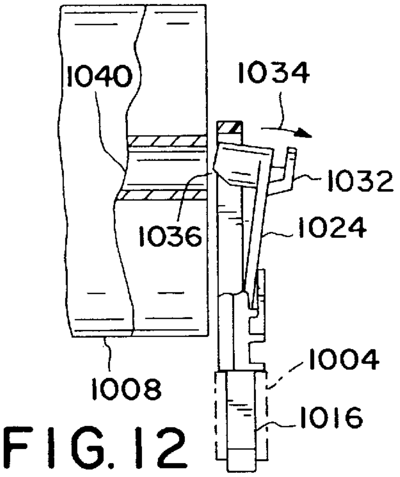
FIG. 12 is a close-up view of the print roll arm of FIG. 11, with the print roller release mechanism actuated.

Pivoting member 1024 also comprises a tab 1032 which permits the merchant to conveniently grasp the tab and pull outward, thereby deflecting pivoting member 1024 out of the page in FIG. 9 (to the right in FIG. 12).

Respective retaining arms 1006 may be conveniently secured to and removed from respective supports 1004 in the following manner.

With continued reference to FIGS. 9 and 10, each support 1004 suitably comprises a channel 902 having a top shoulder 906 and respective bottom shoulders 904. When it is desired to insert retaining arm 1006 into channel 902, shank 1016 is guided into channel 902 with retaining arm 1006 thereafter being manually urged downwardly by the merchant. The downward force applied on shank 1016 causes respective fingers 1018 to deflect inwardly as shank 1016 slides through channel 902. When shoulder 906 of support 1004 contacts a mating shoulder 1022 of retaining arm 1006, respective fingers 1018 expand outwardly, locking into respective shoulders 904. When it is desired to remove retaining arms 1006 from support 1004, the merchant simply grasps respective distal ends 1020 (FIG. 10) of shank 1016 and urges them inwardly, whereupon retaining arm 1006 may be pulled upwardly and released from support 1004.

Figure 11:
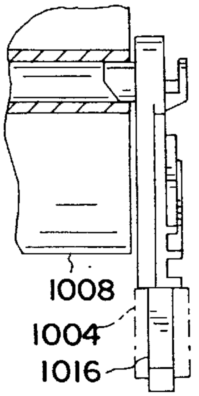
FIG. 11 is a close-up view of a print roll arm retaining mechanism shown engaging the print roll.

With particular reference to FIGS. 11 and 12, paper roll 1008 suitably comprises an axial cylindrical void 1040. Pivoting member 1024 suitably comprises a cylindrical extension 1036 which, in the position shown in FIG. 11, engages cylindrical void 1040, thereby securing paper roll 1008 to respective retaining arms 1006 while permitting roll 1008 to freely rotate as the printing mechanism draws paper 1002 therethrough. When it is desired to remove roll 1008 from respective retaining arms 1006, for example to change the paper roll or to permit access to printer assembly 202, the merchant simply grasps tab 1032 and urges it outwardly along arrow 1034 (see FIG. 12). By resiliently deforming pivoting member 1024 in this manner, extension 1036 is released from cylindrical void 1040, thereby permitting removal of paper roll 1008.

Although the subject invention has been described largely in the context of the appended drawing figures, the scope of the invention is not so limited. Various changes, modifications, enhancements and substitutions may be made in the design and arrangement of the parts and materials discussed herein, without departing from the spirit and scope of the present invention as set forth in the appended claims.

I claim:

1. A point of sale terminal, comprising:

a housing;

card data input means, integral with said housing, for communicating with a transaction card; and a printer assembly including a printing head configured to print transaction data on a receipt;

paper holder retaining arms configured to hold paper, wherein said printer assembly is removably received within said housing while said paper holder retaining arms remain stationary; and, a bracket rigidly secured to and substantially within said housing, and wherein said printer assembly is removably affixed to said bracket, said bracket comprises a substantially rigid first planar surface having a finger extending therefrom, and said printer assembly comprising a second planar surface having an aperture disposed to engage said finger when said printer assembly is secured within said housing, and wherein said second planar surface is disposed to disengage said finger from said aperture when said second planar surface including a flexible tongue is manually pulled upward above said finger.

2. The terminal of claim 1, further comprising a first electronic circuit for assembling an electronic message relating to a sales transaction, and a second electronic circuit for transmitting said message to a remote host computer.

3. The terminal of claim 1, wherein said housing comprises a movable access panel for permitting intermittent access to said printer assembly.

4. The terminal of claim 3, wherein said panel comprises a door hingedly connected to said housing.

5. The terminal of claim 1, wherein said input means comprises a card swipe slot, and wherein said terminal further comprises a magnetic stripe reader circuit associated with said slot and disposed within said housing.

6. The terminal of claim 1, wherein said input means comprises a smart card interface.

7. The terminal of claim 1, wherein said bracket comprises a channel and said printer assembly comprises a substantially rigid member configured for sliding engagement within said channel.

8. The terminal of claim 1, wherein said printer assembly comprises a printer cartridge secured to a substantially planar substrate, and means for manually grasping said printer assembly to manually remove said assembly from said housing.

9. The terminal of claim 1, wherein said housing comprises an electrical interface for maintaining electrical communication with said printer assembly.

10. The terminal of claim 9, wherein said printer assembly comprises an interface surface for mechanically and electrically contacting said electrical interface.

11. In a POS terminal for use in sales transactions of the type comprising: an integral printer substantially disposed within the terminal housing; a bracket rigidly secured to and substantially within said housing, and said integral printer is removably affixed to said bracket, said bracket comprises a substantially rigid first planar surface having a finger extending therefrom, and said printer assembly comprises a second planar surface having an aperture disposed to engage said finger when said printer assembly is secured within said housing; a card data input mechanism; a human readable display; and a transmission circuit for transmitting messages to a remote host computer, a method for replacing said printer, comprising the steps of:

grasping said printer;

disengaging said finger from said aperture by manually pulling said second planar surface including a flexible tongue upward above said finger; and removing said printer from said housing.

12. The method of claim 11, further comprising the step of moving a panel which at least partially conceals said printer before removing said printer from said housing.

13. The method of claim 12, wherein said moving step comprises opening a door which is hingedly attached to said housing.

14. The method of claim 11, wherein said grasping step comprises manually grasping said printer, and wherein said removing step comprises sliding said printer out of said housing without the use of tools.

15. The method of claim 11, further comprising the steps of:

manually installing a replacement printer cartridge into said terminal; and thereafter threading a web through said cartridge and out of said housing.

16. The method of claim 15, wherein said installing step comprises sliding said cartridge along a rail within said housing.

17. The method of claim 15, further comprising the step of manually closing a hinged door to thereby substantially conceal said cartridge within said housing.

* * * * *